UNITED STATES PATENT OFFICE.

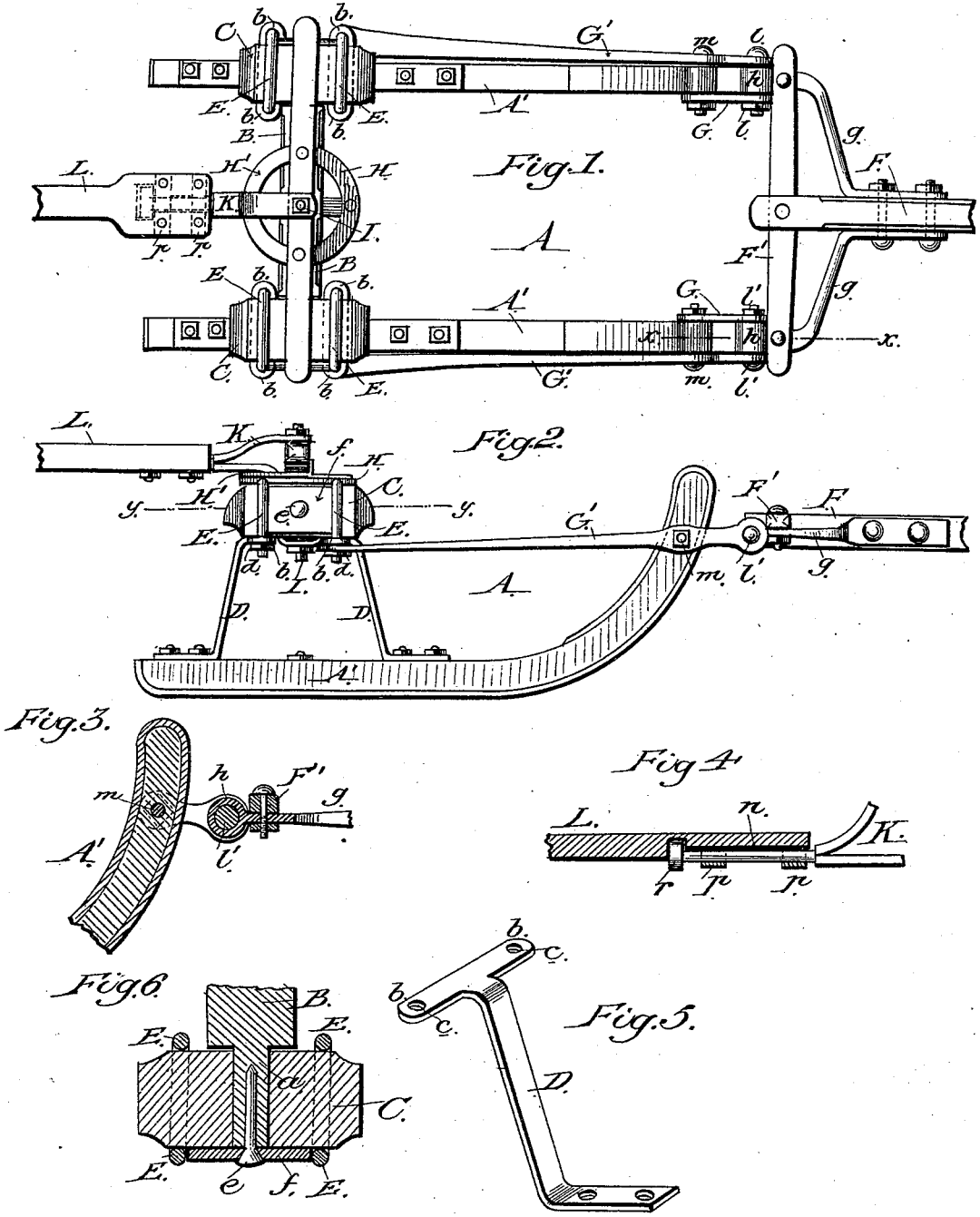

FRANCIS M. CONNER, OF AURELIA, IOWA.

SLED.

SPECIFICATION forming part of Letters Patent No. 395,879, dated January 8, 1889.

Application filed May 3, 1888. Serial No. 272,648. (No model.)

*To all whom it may concern:*

Be it known that I, FRANCIS M. CONNER, a citizen of the United States, residing at Aurelia, in the county of Cherokee and State of Iowa, have invented certain new and useful Improvements in Sleds, of which the following is a full and clear description, reference being had to the accompanying drawings, forming part of this specification, in which—

Figure 1 represents a plan view of the front section of a sled having my improvements attached. Fig. 2 is a side elevation of the same. Fig. 3 is a detailed sectional view on the line $x\,x$ of Fig. 1. Fig. 4 is a detail showing the bolster and the forward end of the reach swiveled thereto. Fig. 5 is a detail to be referred to. Fig. 6 is a detailed sectional view on the line $y\,y$ of Fig. 2.

My invention relates to certain new and useful improvements in sleds; and it consists in the constructions and combinations of devices, which I shall hereinafter fully describe and claim.

To enable others skilled in the art to make and use my invention, I will now describe the same and indicate the manner in which the same is carried out.

In the said drawings, A indicates the forward section of a sled having the usual runners, A'; and B represents the axle-tree or cross-beam having cylindrically-turned ends $a$, which are fitted to turned in head blocks or boxes C, as shown in Fig. 6. The head blocks or boxes C are supported upon braces D, having flanged or outwardly-turned bases, which are bolted to the runners, the upper ends of said braces being formed with T-shaped heads $b$, (see Fig. 5,) which are bent under the ends of the head blocks or boxes C, so that the outer ends of said heads $b$ will project slightly beyond each side of the head-blocks, said projecting ends having openings $c$, through which the lower threaded ends of ⊓-shaped clips E are passed and secured by nuts $d$. The clips E, as before stated, pass over the ends of the head-blocks, which are bored centrally to receive the ends of the axle-tree B, and by securely binding said head-blocks obviate all danger of the same splitting. The outer ends of the axle-tree are engaged by headed bolts $e$, which first pass through cap-plates $f$ on the outside of the head-blocks between the clips, and then into the cylindrical ends of the axle-tree, whereby the latter is permitted to have an oscillating movement, while at the same time the runners are held in position and prevented from spreading apart.

The pole or tongue F is provided with oppositely-extending brace-irons $g$, which are bolted to the sides of the pole and the under side of the cross-beam F' and extend slightly beyond or back of said beam, where they terminate in short tubular portions or sockets $h$, as shown in Fig. 1, said tubular portions being confined between the front projecting ends of braces or rods G G', and being held in position by suitable bolts and nuts, $l\,l'$, whereby any wear or lost motion between the tubular portions and the braces or rods may be readily taken up.

The braces or rods G are pivoted upon the bolts $l$ and upon other bolts, $m$, passing through the upper curved end of the runners and the braces, while the other braces or rods, G', are also secured by said bolts $l$ and $m$, and extend backward to the clips E, upon the ends of which they are secured by the nuts $d$.

From this description it will be seen that the pole or tongue is permitted to have a free oscillating movement upon the bolts $l$. At the same time the draft or pull which is upon the braces or rods G and G' is partially removed from the curved ends of the runners and is principally upon the braces, which hold the axle-tree in position.

The lower fifth-wheel plate, H, is securely bolted to the axle-tree B, and the upper plate, H', is similarly bolted to the bolster, the king-bolt I being passed through said bolster and axle-tree in the usual manner.

A plate or connection, K, has its front end bifurcated, so that its members will lie upon the upper and lower surface of the bolster, and be secured to said bolster by the king-bolt, which passes through them, and the rear end of said plate or connection is cylindrically formed and seated in a groove, $n$, in the under face of the reach L, which connects the rear section (not shown) of the sled with the forward section, A, said cylindrical portion being confined within its grooved seat by suitable cap-plates, $p$, whereby the reach may have an oscillating movement on the cylindrical portion of the plate or connection K to enable the rear section of the reach to accommodate itself to the uneven or undulating condition of the ground, the said cylindrical portion being also provided with a head or disk, $r$, by means of which the reach is prevented from disengaging itself from its connection with the plate K.

In view of the above construction I am enabled to provide a strong and secure sled in which the principal parts are securely braced. At the same time the pole or tongue, the reach, and the axle-tree are mounted so as to have an oscillating swinging movement, thus enabling the sections of the sled to accommodate themselves to the irregularities of the surface over which the sled passes.

Having thus described my invention, what I claim as new, and desire to secure by Letters Patent, is—

1. In a sled, the combination, with the runners and the oscillating axle-tree, of the braces D, having T-shaped heads, the head-blocks in which the ends of the axle-tree are mounted, and the clips E upon the ends of said head-blocks, by which said blocks are secured to the braces, and also prevented from splitting, substantially as described.

2. In a sled, the runners, the braces D, having T-shaped heads, and the head-blocks clipped thereto, in combination with the axle-tree having rounded ends fitted to rotate in said heads, the cap-plates on the outside of the heads between the clips, and the headed bolts passing through said plates into the ends of the axle-tree and holding the runners in place, substantially as described.

3. In a sled, the runners, the braces D, and the head-blocks clipped thereto, in combination with the axle-tree mounted to rotate in said boxes and provided with the lower fifth-wheel plate and king-bolt, the bolster swiveled on said bolt and carrying the upper fifth-wheel plate, the plate or connection K, secured to the bolster and provided with a rounded or cylindrically-formed rear end, and a reach secured thereto and having a grooved under face for said end, whereby said reach is permitted to turn thereon, substantially as described.

4. The runners, the oscillating axle-tree, the head-blocks, and the braces to which the latter are clipped, in combination with the pole or shaft having the tubular sockets $h$, the brace-rods G G', extending beyond the front of the runners, the bolts passing through the ends of said rods and the tubular sockets, whereby the pole is pivotally secured, and the adjusting-nuts on said bolts, substantially as described.

FRANCIS M. CONNER.

Witnesses:
B. R. WHITNEY,
A. J. GROFF.